United States Patent [19]

Gebhardt

[11] Patent Number: 5,281,125

[45] Date of Patent: Jan. 25, 1994

[54] DEVICE FOR THE PRODUCTION OR MANUFACTURE OF STONES OR BLOCKS

[76] Inventor: Siegfried Gebhardt, Tobelstadel, D-7971 Aichstetten-Aitrach, Fed. Rep. of Germany

[21] Appl. No.: 822,414

[22] Filed: Jan. 17, 1992

[30] Foreign Application Priority Data

Jan. 21, 1991 [DE] Fed. Rep. of Germany ....... 4101593

[51] Int. Cl.⁵ ............................................ B28B 13/00
[52] U.S. Cl. .................................... 425/253; 425/258; 425/421; 425/422; 425/424; 425/432; 425/439; 425/454
[58] Field of Search ................ 249/119, 137; 425/218, 425/227, 253, 256, 258, 406, 412, 413, 421, 422, 424, 425, 432, 435, 439, 448, 453, 454, 456

[56] References Cited

U.S. PATENT DOCUMENTS

| 2,825,954 | 3/1958 | Ripley . | |
|---|---|---|---|
| 3,006,053 | 10/1961 | Miller . | |
| 3,196,513 | 7/1965 | Parma | 425/439 |
| 3,425,105 | 2/1969 | Gulde | 425/448 |
| 3,426,404 | 2/1969 | Yamasita . | |
| 3,876,360 | 4/1975 | Arriaga | 425/424 |
| 4,005,972 | 2/1977 | Sommers | 425/439 |
| 4,025,265 | 5/1977 | Auer | 425/432 |
| 4,111,627 | 9/1978 | Kitahara | 425/432 |
| 4,238,177 | 12/1980 | Crile et al. | 425/432 |
| 4,332,540 | 6/1982 | Van de Caveye | 425/421 |
| 4,395,213 | 7/1983 | Springs et al. | 425/421 |

FOREIGN PATENT DOCUMENTS

| 191271 | 3/1906 | Fed. Rep. of Germany . | |
| 579442 | 10/1924 | France . | |
| 2127274 | 9/1972 | France . | |
| 619228 | 3/1961 | Italy | 425/258 |

Primary Examiner—Scott Bushey
Attorney, Agent, or Firm—Davis, Bujold & Streck

[57] ABSTRACT

On a device for the production or manufacture of stones, particularly of paving stones, block or formwork stones, with a material box, a mould box or flask, a shake device with compaction rams or presses, to a main frame main cylinders are fastened, to whose main pistons operating in vertical direction the mould box or flask is fastened via a supporting frame. The material box is arranged on the main frame above the mould box or flask. The compaction rams or presses are arranged under the mould box or flask. Draw or traction cylinders are arranged on the main frame via interlocking elements. These cylinders are connectable to the compaction rams or presses. The mould box or flask with the compaction rams or presses and a ram or press support are connected, rotatable by at least approximately 180° via the supporting frame, to the main frame and the main cylinders.

14 Claims, 4 Drawing Sheets

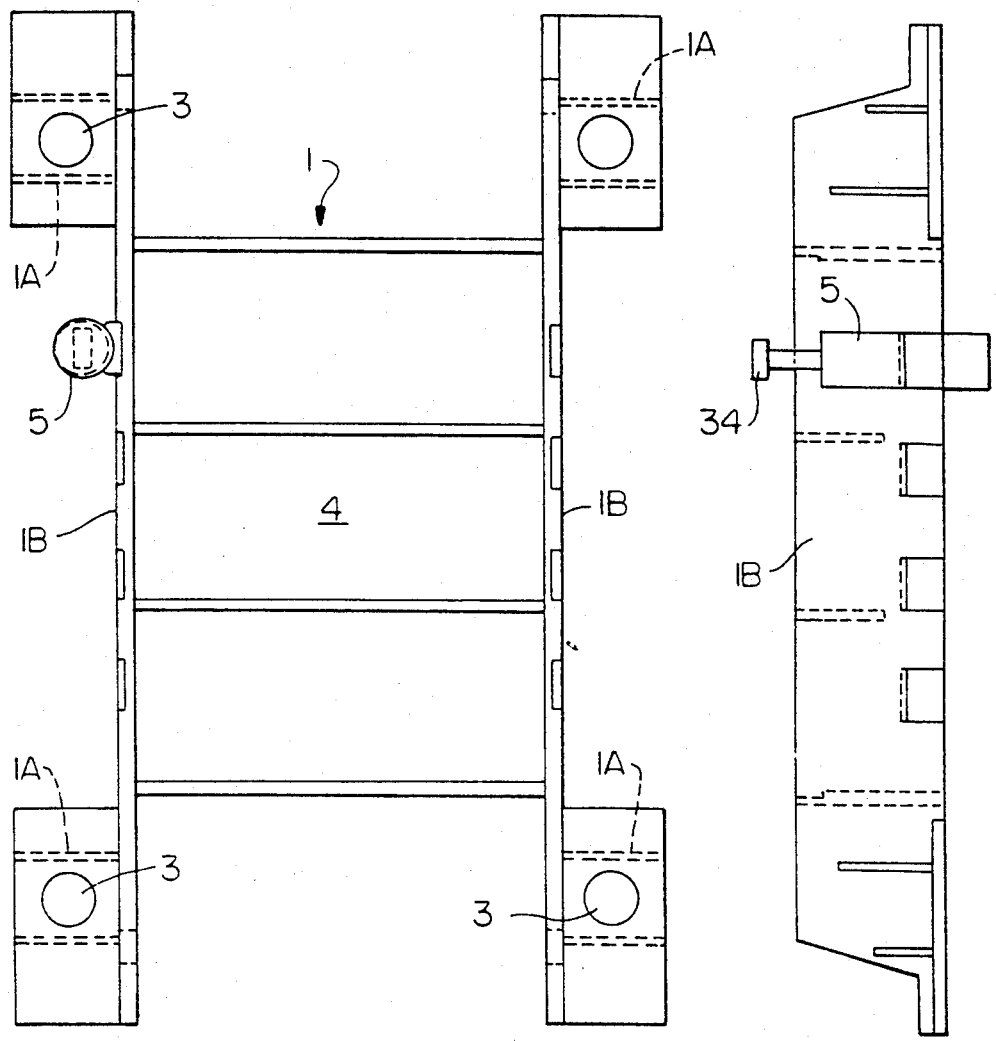

DEVICE FOR THE PRODUCTION OR MANUFACTURE OF STONES OR BLOCKS

This invention relates to a device for the production or the manufacture of stones, in particular paving stones, block or formwork stones, with a material box, a moulding box or flask, a shake device and compaction rams or presses.

BACKGROUND OF THE INVENTION

In well-known devices for the production or manufacture of stones, a mould box or flask is filled by means of a filling carriage or material box, which travels or moves from the side over the mould box or flask and returns back after filling of the material. Afterwards, a ram or press travels from above into the mould box or flask and by means of vibrators on the mould box or flask or so-called shaker devices the material in the mould box or flask is compacted, whereupon the mould box or flask is lifted away upwards. The plate located under the mould box or flask, on which the stones are placed, is transported away. This is followed by the next production or manufacturing operation.

A disadvantage in this process is, however, that with the well-known devices for the production or manufacture of stones, compaction can essentially be created or brought about only by vibration on the mould box or flask or on the shaker device lying at the bottom. A simultaneous pressing operation is not possible, as otherwise the shaking force is destroyed by the compaction. In addition, the precise production or manufacture is not possible since the stones are generally produced or manufactured on a concrete floor, where no pressure can be brought onto the stones, as otherwise the machine is lifted or raised. In the case of manufacture or production with a stationary machine, the height of the stones cannot be brought under control due to the shaking operation and due to the pressing operation, i.e. differences in height must be accepted. Added to this is the fact that due to the immersion of the ram or press into the mould box or flask certain or well-defined tolerances must be warranted or guaranteed, since a burr always occurs during manufacture or production especially due to the core holder.

One of the main disadvantages of the previously known devices and methods or processes for the production or manufacture of stones lies in the fact that during the production or manufacture of stones, finer materials are shaken downwards out of the stone production material, which is why the stones produced or manufactured in this way possess a coarser upper surface — in comparison with undersurface — and also do not possess straight edges and exact angles.

In the well-known devices for the production or manufacture of stones there is also the disadvantage that they require a great deal of space.

SUMMARY OF THE INVENTION

The object of this invention is, therefor, to create a device of the type mentioned at the beginning of this description which requires little space and, with a high cycle time, makes stones that are very uniform and true to size.

According to the invention, this problem is solved in that, main cylinders are fastened to a main frame, to whose main pistons operating in a vertical direction, the mould box or flask is fastened by means of a supporting frame, the material box is arranged on the main frame above the mould box or flask, the compaction rams or presses are arranged under the mould box or flask, draw or traction cylinders arranged on the main frame via interlocking elements are connectable to the compaction rams or presses, and the mould box or flask is connected to the compaction rams or presses and a ram or press support rotatable by at least approximately 180° via the supporting frame to the main frame and the main cylinders.

An essential advantage of the solution according to the invention is that the ram or press is always located in or under the mould box or flask and production or manufacture can be carried out precisely. Because of this, stones in different heights can be produced or manufactured without any problems or difficulties. Depending on how far the ram or press travels into the mould box or flask, the stone can be manufactured thicker or thinner.

Since, with the manufacturing device, method or process according to the invention the later upper side of the stone is located at the bottom, and the compaction rams or presses also press upwards, there is no disadvantageous segregation of coarse and fine materials, in contrast to the present state of the art. To the contrary, during the shaking process or operation the fine materials get into the moulds of the mould box or flask downwards, whereby the upper or top side of the stone formed in this way can be produced or manufactured very exactly and cleanly. In this way, for example, straight and sharp edges and corners are created. Equally so, exact grooves or slots and threads can be formed cleanly and true to size into the stone, as well as special surface structuring.

Since, with the device according to the invention, all movements can be actuated hydraulically and work can be carried out with great pressure, a corresponding heat is created, which can be conserved in an oil tank, in order to subsequently heat drying ducts or channels in which the stones are dried after their manufacture or production. This means that the system or plant can be operated in an energy-saving manner.

The device is also very small and compact, i.e. space-saving. As a consequence of this, the device can be insulated at low cost with regard to sound and heat.

The device according to the invention is very clearly laid out because of its simple design covering a small area of space.

In addition, there are almost no mechanical parts on the device according to the invention. All movements can be transmitted direct via the cylinders by means of special rubber and metal bonded buffers.

Since everything can be directly controlled electronically via the cylinders, the device according to the invention has a very high cycle time.

By means of rubber and metal bonded members arranged between the shaker device or unit and the cylinders arranged on the device, the machine can vibrate completely within itself without the cylinders being detrimentally affected. The shaking force can be applied up to 100% of the material. The draw or traction cylinders can likewise be mounted on a rubber and metal bonded member and provided with a dovetail suspension. They can engage directly with a tolerance of 0.5 mm on traction or draw.

The device according to the invention is also characterized by its low overall weight.

In an advantageous way, the mould box or flask is detachably connected to the supporting frame, whereby a very fast exchange of the mould box or flask can be made if other stones are to be produced or manufactured, with which the system or plant can be specifically controlled flexibly and fast.

BRIEF DESCRIPTION OF THE DRAWINGS

Further advantageous designs and embodiments of the invention result from the sub-claims and the exemplary embodiment showing the underlying principle in the following with the aid of the drawings.

Shown are:

FIG. 3 a plan view of the main frame;

FIG. 4 a side view of the main frame shown in FIG. 3; and

BRIEF DESCRIPTION OF THE PREFERRED EMBODIMENT

Figure 1:
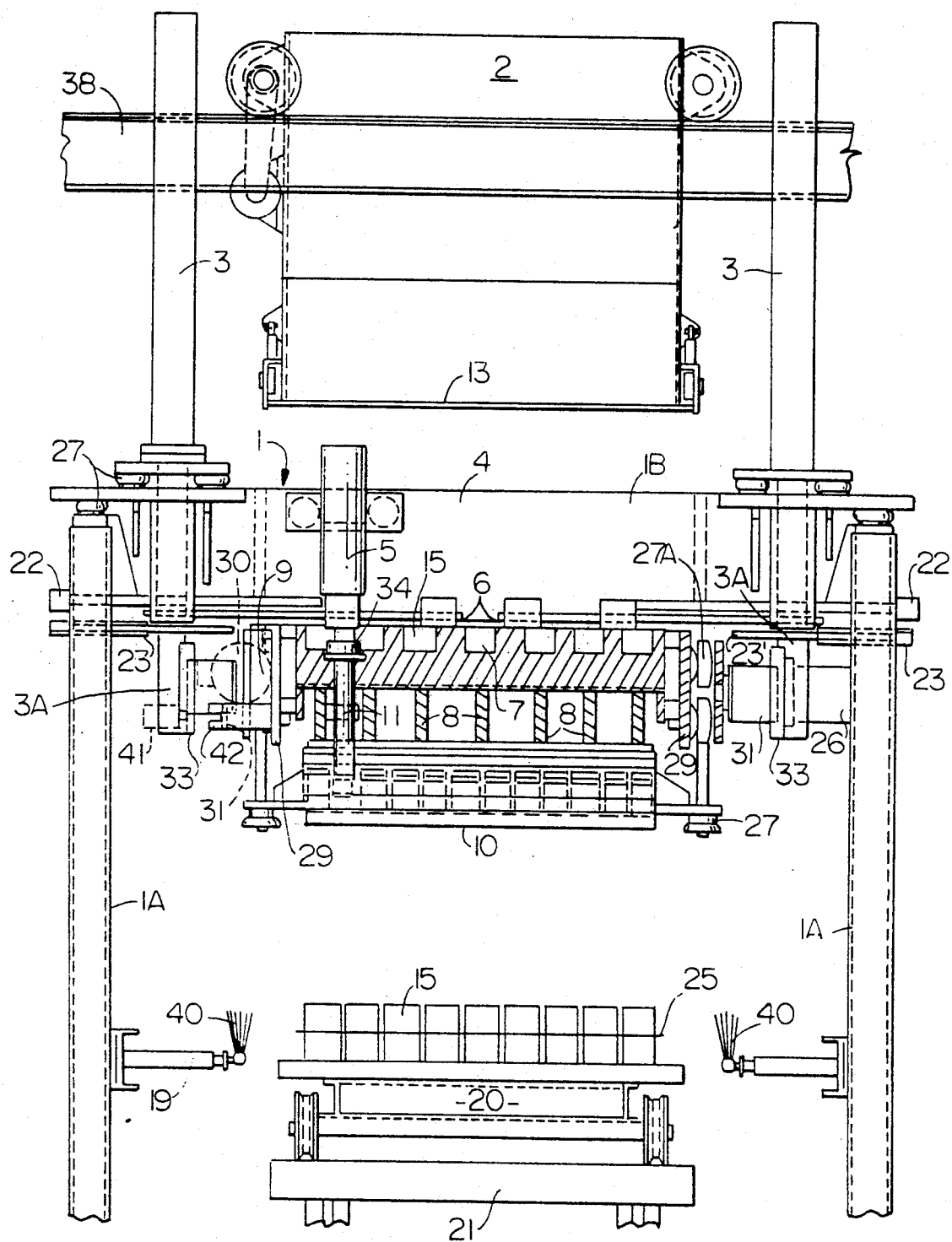
FIG. 1 a side view of the device according to the invention, partially in section.

The shown embodiment displays a box-like main frame 1 with four vertical supports 1A and two cross or transverse supports 1B. A material box 4 is arranged in the upper area of the main frame 1 between the supports 1A and cross or transverse beams 1B. The walls of the material box 4 serve at the same time to stiffen the main frame. Above the main frame 1 there is arranged a mobile material bucket 2.

On the main frame 1 four main cylinders 3 with main pistons 3A are placed on top in the corner areas. Furthermore, a plurality of draw or traction cylinders 5 are arranged on the cross beam or support 1B of the main frame 1. Also fastened to the main frame 1 is a horizontally slidable draw or traction sheet or plate 6. Under the sheet or plate 6 there is located a mould box or flask (container) 7. Compaction rams or presses 8 are arranged under the mould box or flask 7. The mould box or flask 7 is provided with cylinders 9 for the removal of the mould or form from the stones. A ram or press support 10 is arranged underneath the compaction ram or press 8 for this.

Draw or traction tubes 11 provide a connection of the draw or traction cylinders 5, for the ram or press support 10, to the compaction rams or presses 8 for a pressing operation.

Figure 2:
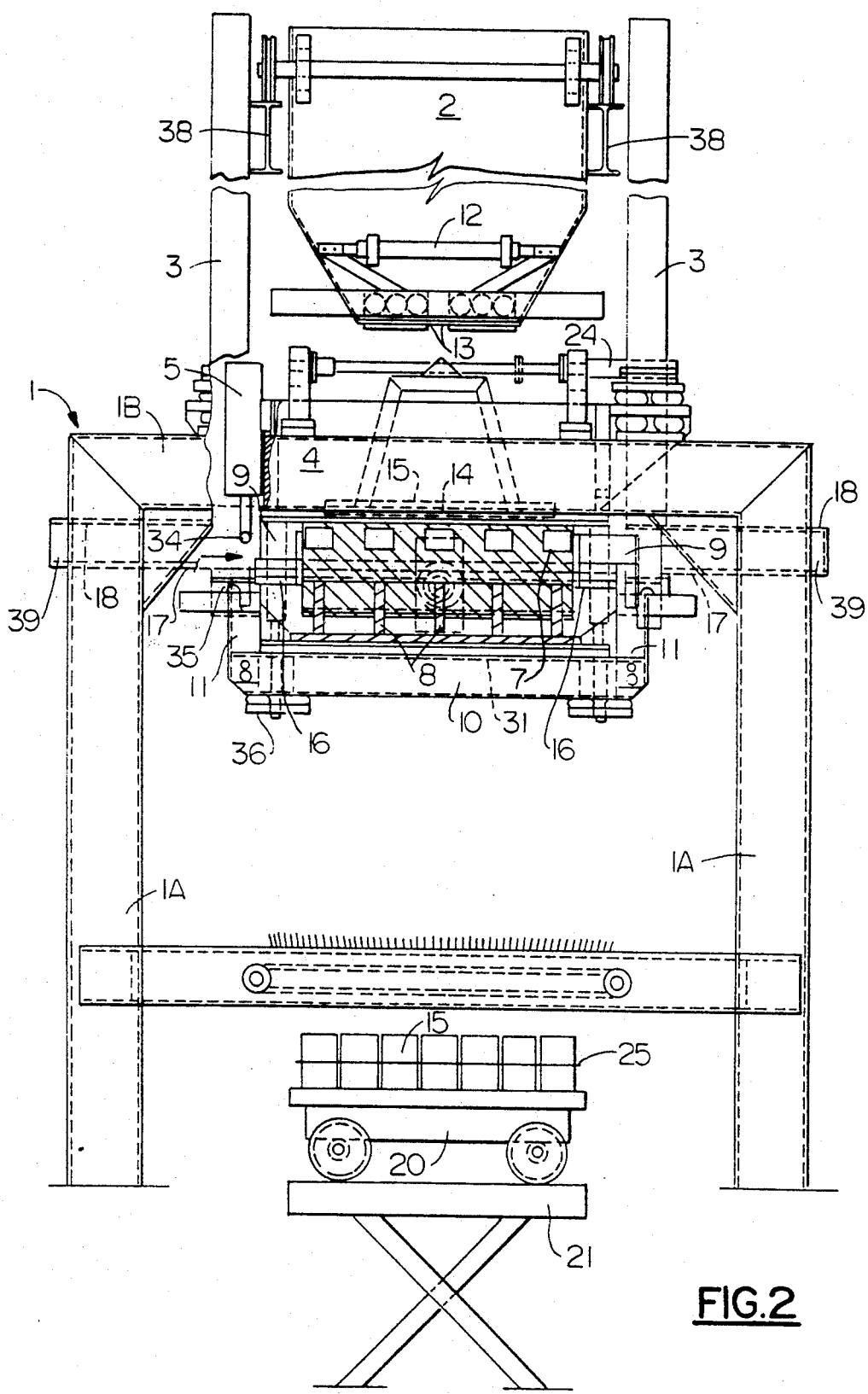
FIG. 2 a side view, partially in section, which is 90° to the side view according to FIG. 1.

As can best be seen from FIG. 2, the underside of the material bucket 2 is obstructed by a horizontally slidable single or two-section draw or traction sheet or plate 13, with a cylinder 12 with actuation levers being provided for its sliding, i.e. for opening and closing of the underside of the bucket 2.

Figure 5:
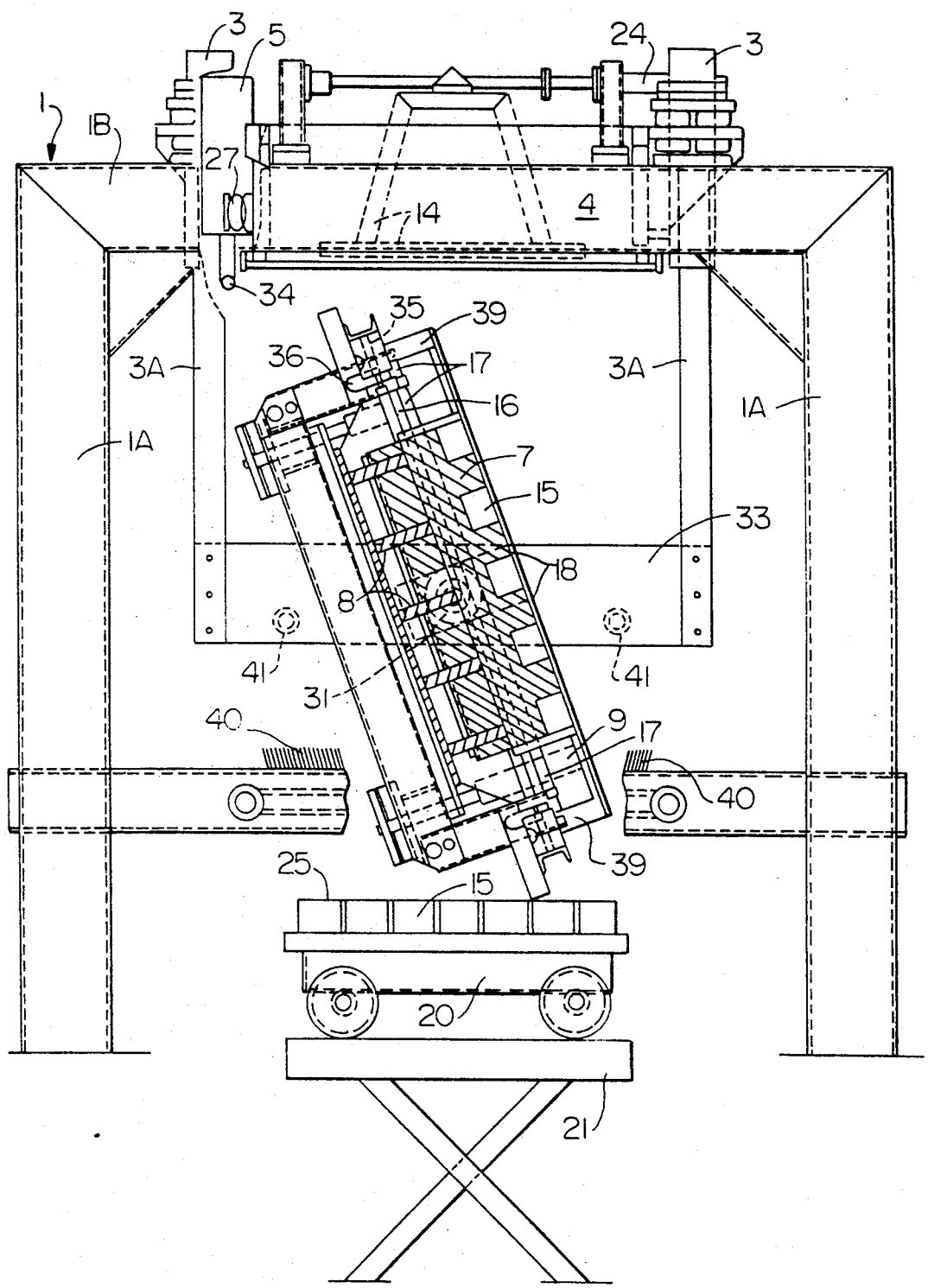
FIG. 5 a side view, in accordance with FIG. 2, with the mould box or flask in a partially turned position.

Underneath the sheet or plate 13, a material rake 14 is arranged on the main frame 1 above the mould box or flask 7 (FIGS. 2 and 5).

In the mould box or flask 7 there are moulds or forms for paving stones 15. Instead of paving stones 15, other stones can of course also be produced or manufactured, such as formwork stones or hollow block stones for walls.

FIG. 2 shows, between the two opposing draw or traction tubes 11 likewise opposing interlocking cylinders 16, which work together with an interlocking device which is described more thoroughly in the following description.

Arranged on both sides of the mould box or flask 7 is a cylinder 17 for actuation of a horizontally slidable two-section mould or form cover sheet or plate 18. The connection of the piston rods of the two cylinders 17 with the respectively associated mould cover sheet halves 18 is effected in each case by vertical connecting pieces 39. Arranged for reasons of space and for opening of the mould cover sheet or plate 18, the piston rods are each moved outward, whereas in a closed position they thus do not project beyond the periphery or circumference of the mould box or flask 7 and hence do not disturb its rotation or turning.

In the lower area of the main frame 1, cylinders 19 with pistons are arranged adjacent of a palletizing unit 20. The pistons are provided with brushes 40.

The palletizing unit 20 is located on a lifting platform 21 including a scissor-type lift.

Arranged on the main frame 1 are two opposed cylinders 22 for actuation of the draw or traction sheet or plate 6 of the material box 4.

Underneath cylinder 22, in each case, is located a cylinder 23 whose piston is provided, in each case, with a rubber scraper 23', for cleaning the mould or flask surface.

As can best be seen in FIG. 2, above the material rake 14 in the main frame 1 there is a cylinder 24 with a piston for its actuation.

On the palletizing unit 20, between two rows of paving stones 15, one above the other, an intermediate sheet or plate 25 with ventilation openings is arranged.

Underneath the material box 4 is a motor 26 for the shaker drive 30, which is separated from the cylinders of the device by rubber and metal bonded members (damping member) 27 and 27a, to prevent their damage and wear.

In the area of the rubber and metal bonded member (damping member) 27a there is a side frame 29. The mould box or flask 7 is fastened to the side frame 29 so that it can be moved.

The mould box or flask 7 is located in a completely rotatable machine base section which also has the compaction rams or presses 8, the cylinder 9 for the removal of the mould or form from the stones, the ram or press support 10, the draw or traction tubes 11, the cylinders 16 and 17 for interlocking with the draw or traction cylinders 5 and for controlling the mould cover plate, the mould cover plate 18 itself, the motor 26 with the rubber and metal bonded members (damping member) 27 and the side frames 29. Two pivot bearings 31 for the machine base section are each located in a supporting frame 33 which, in each case, is connected with two opposite main pistons 3A of the main cylinders 3 (see in particular FIG. 5).

Connected to the main cylinders 3 are, in the lower area, main pistons 3A which, in each case, are arranged on a supporting frame 33.

The production sequence is as follows:

Material is placed into the material bucket 2 from a mixing system. After this, it travels on tracks 38 over the main frame 1 and is thus located above the stationary material box. By actuation of the cylinder 12, by which the two draw or traction sheets or plates 13 are separated, the quantity of material is precisely dosed or metered into the material box 4.

By actuation of the cylinder 24, the material rake 14 is moved and when the draw or traction sheet or plate 6 is pulled back, material falls into the moulds or forms of the mould box or flask 7. The material forms the paving stone or hollow or formwork stone 15.

After the material has filled each mold to a desired level, the draw or traction sheet or plate 6 moves inwardly again to close the molds. By employing hard-metal segments in the lower region of the mould box or flask 7, the wear due to the movement in and out of a draw or traction sheet or plate can be prevented or minimized at the very least. After this, the main piston 3A of the main cylinders (product removing) 3 move, via the supporting frame 33, the mould box or flask 7 a few centimeters downward along with the ram or press support 10, the cylinder 9 for removal of the mold or form from the stones, the draw or traction tube 11, the compaction frame or press 8 and the side frame 29.

Subsequently, the pistons of the cylinders 23, which are fitted on both sides with rubber scrapers 23', travel under the draw or traction sheet or plate 6 and scrape precisely and cleanly the upper edge of the mould box or flask 7 and the draw or traction sheet or plate 6 of all concrete residues so that the surfaces are smooth.

When this operation has been terminated, the pistons 3A of the main cylinders 3 move the mould box or flask 7 back against the draw or traction sheet or plate 6. The four draw or traction cylinders 5, which are arranged on each of the two cross beams 1B grip, via their pistons, the draw or traction tubes 11 (for reasons of clarity only one draw or traction cylinder 5 and one draw or traction tube 11 is shown in FIG. 1). The interlocking of the eight draw or traction cylinders 5 with the eight draw or traction tubes 11 of the mould box or flask 7 is achieved by the piston rods of the interlocking cylinders 16. For this purpose the draw or traction tubes are each provided with vertical slot-like recesses 36, whose opening is located at the top. Laterally, beside the recesses 36 there is a locking bolt 35 each of which is provided with the piston rod of the associated interlocking cylinder 16. The ends of the piston rods of the draw or traction cylinders 5 are provided with a cross piece or a hook 34 (see FIGS. 1 and 2). For interlocking, the pistons rods of the draw or traction cylinders 5 travel downwards with their hooks 34 into the slot-like recesses 36. Subsequently, the piston rods of the interlocking cylinders 16 are pulled back with the locking bolts 35 fastened thereto (in the draw or tractioning according to FIG. 2 towards the right), due to which the slot-like recesses 36 are closed at the top, whereby the hooks 34 are thus located under the locking bolts 35.

Subsequently, the piston rods of the draw or traction cylinders 5 pull the compaction ram or press 8 together with the ram or press support 10 upwards with approx. 400 tonnes, with the simultaneous application of the shaker device 30 against the material 15 and press against the draw or traction sheet or plate 6, which supports itself on the main frame 1.

The mould box or flask 7, the compaction ram or press 8, the cylinder 9 for removal of the mould or form from the stone, the ram or press support 10, the draw or traction tube 11, the side frame 29 and the main cylinders 3 with the rubber and metal bonded members (damping member) 27 represent an element freely oscillating by itself.

To improve the compaction, the ram or press support 10 can be with the compaction ram and press 8 briefly under the vibration and pressure operation of the rams or presses and tightened again, so that the fine material of the concrete can migrate into the lower region for the generation of a clean and finely structured surface of the stone 15 to be moulded or formed. In the further manufacturing or production process, the pistons of the main cylinders 3 travel downward with the completely rotatable machine lower section. In this hydraulic operation the machine lower section is turned completely by 180° with the mould box or flask 7.

At the same time, the mould or flask cover sheets or plates 18 are pushed by the pistons of the cylinders 17 over and cover the compacted stones so that they cannot fall out due to centrifugal force at the high rotary speed (see FIG. 5).

Shortly after the rotating operation has terminated and the machine lower section is horizontal again, but is turned completely 180°, the mould or form cover plates 18 are moved outward by the pistons of the cylinders 17.

After this operation, the stones are "pushed downwards" by the ram or press support 10 and the compaction ram or press 8. At the same moment the lifting platform 21, which is located directly below it, goes down the thickness of the stone height and the stones 15 are removed from the moulds or forms.

At the same time, the complete machine lower section also travels upwards and the bottom is briefly cleaned by the brushes 40. After further movement upward, the return rotary operation begins. At the same time, a plastic intermediate plate 25, provided with ventilation holes, is placed on the fresh row of stones by a vacuum unit (not shown). The intermediate plate 25 serves as a spacer and prevents the bonding-together of the stones in a fresh condition. The ventilation are made so that the hydration heat leads the entirely finished package to a faster setting process.

When the return rotation operation has terminated, the mould box or flask 7 travels upward and the operation just described is repeated.

In order that the swivelling machine lower section, in which the mould box or flask 7 forms the core, is brought back into an exactly horizontal position after the rotation process, positioning and arresting elements are also additionally provided. They can, for example, have four positioning cylinders 41, which are fastened to the supporting frame 33. The piston rods of the positioning cylinders 41 are in each case provided with a turned or conically tapering point. After the rotary operation, these piston rods then in each case move in likewise tapered or turned positioning bushes 42. The positioning bushes 42 are arranged via rubber and metal bonded members (damping members) at the side frames 29. For reasons of clarity, the positioning cylinder 41 and the positioning bush 42 are indicated only faintly in FIGS. 1 and 5. When the piston rods of the positioning cylinders 41 have engaged in the positioning bushes 42, an exact horizontal position of the machine lower section is achieved. For swivelling, the piston rods must be pulled back or withdrawn.

A great advantage, furthermore, is that due to the high pressures that can be applied to the material (approx. 400 tonnes and, for example, 12 vibrators with approx. 18,000 kg shaking force) there is optimal compaction. This means a cement savings of approx. 20-25%.

When a desired number of rows of stones have been placed on the palletizing carriage 20, the lifting platform 21 is lowered and the palletizing carriage 20 is moved away and is replaced by a new empty palletizing carriage. For the drying of the stones the palletizing carriage 20 can be run into a drying tunnel or a drying oven in the usual way.

I claim:

1. A vertically oriented device for the manufacture of concrete products, said device comprising:
   a main frame;
   a material box;
   a mould container; and
   compaction members;
   wherein said main frame includes main cylinders vertically oriented and fastened thereto, each said main cylinder supports a main piston operable in a vertical direction and connected to a supporting frame supporting said mould container, said material box is located on said main frame above said mould container and said compaction members are located under said mould container, draw cylinders are located on said main frame and are connectable and disconnectable with said compaction members via releasable interlocking elements, and said mould container and said compaction members are rotatable by rotation means relative to said supporting frame by at least approximately 180°.

2. A device as claimed in claim 1, wherein said device includes a shaker device which engages and shakes said mould container and said shaker device is rotatable together with said mould container, and said rotation means comprises a pivot member.

3. A device as claimed in claim 1, wherein damping members are arranged between said shaker device and said mould container.

4. A device as claimed in claim 1, wherein a movable material bucket is arranged above said material box.

5. A device as claimed in claim 1, wherein at least one draw plate is slidably fastened horizontally to said main frame above said mould container, and said mould container is supported against said draw plate during a pressing operation.

6. A device as claimed in claim 1, wherein said mould container is detachable connected to said supporting frame.

7. A device as claimed in claim 1, wherein said mould container is coverable by a mould container cover member.

8. A device as claimed in claim 7, wherein said mould container cover member is two-part member and each of the two-part members is slidable via piston rods supported by cylinders arranged laterally of said mould container.

9. A device as claimed in claim 1, wherein said interlocking elements are located between a press support, supporting said compaction members, and said draw cylinders.

10. A device as claimed in claim 1, wherein said mould container is provided with product removing cylinders for removing manufactured product therefrom.

11. A device as claimed in claim 1, wherein positioning elements are arranged on one of said supporting frame and said mould container to assist with maintaining said mould container in a substantially horizontal returned position.

12. A device as claimed in claim 1, wherein a movable pallet unit is arranged under said mould container.

13. A device as claimed in claim 12, wherein said pallet unit has a pallet carriage which is supported by a lifting platform.

14. A device as claimed in claim 12, wherein said pallet unit is sized so that several rows of manufactured product are stackable on top of one another on said pallet unit, and an intermediate member, provided with openings therein, is positionable between adjacent rows of stacked manufactured product.

* * * * *